No. 844,549. PATENTED FEB. 19, 1907.
H. E. SPANGLER.
SPRING PRESSING MACHINE.
APPLICATION FILED SEPT. 18, 1906.
2 SHEETS—SHEET 1.
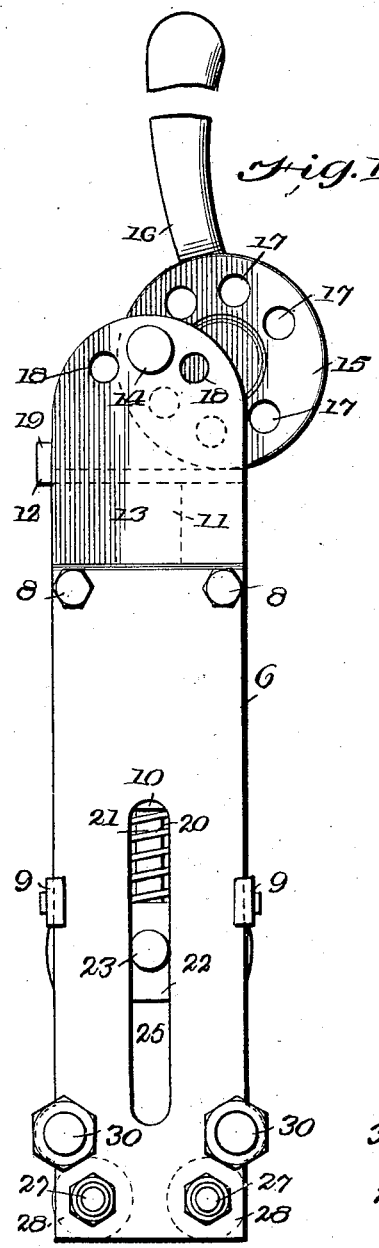
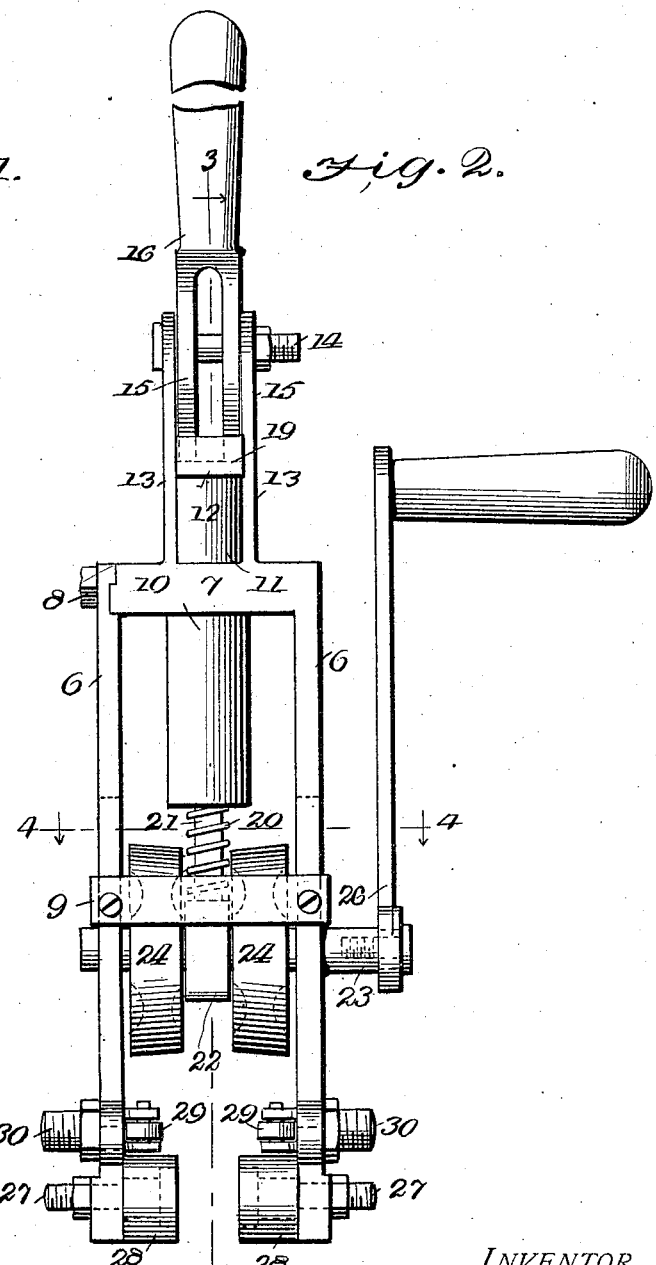
WITNESSES:
F. C. Barry
Geo. E. Tew
INVENTOR
Harvey E. Spangler.
BY Milo B. Stevens & Co.
Attorneys No. 844,549. PATENTED FEB. 19, 1907.
H. E. SPANGLER.
SPRING PRESSING MACHINE.
APPLICATION FILED SEPT. 18, 1906.
2 SHEETS—SHEET 2.
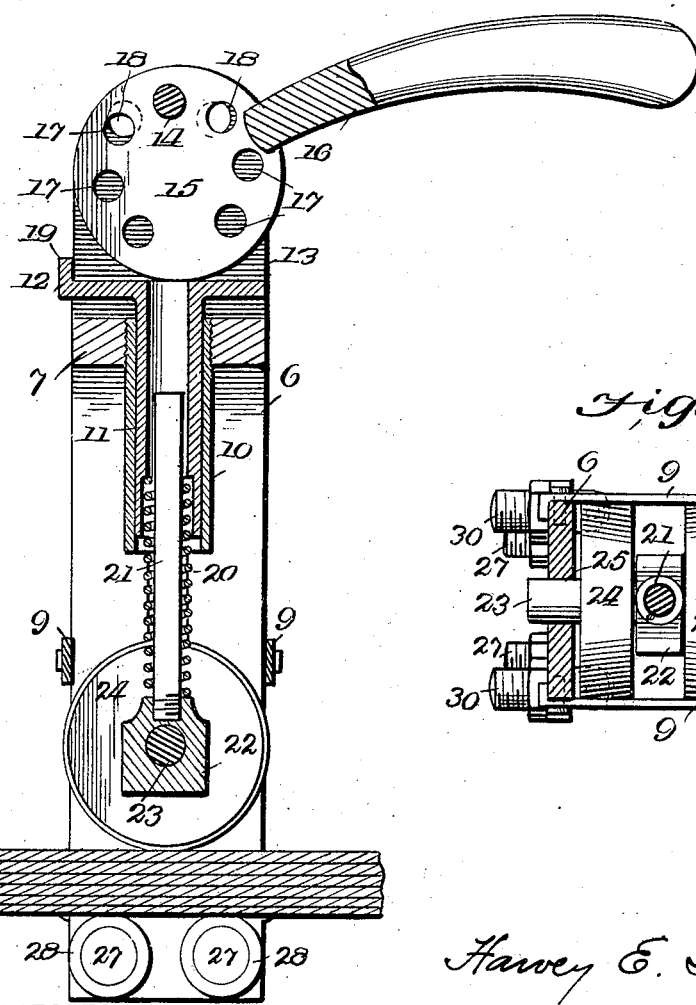
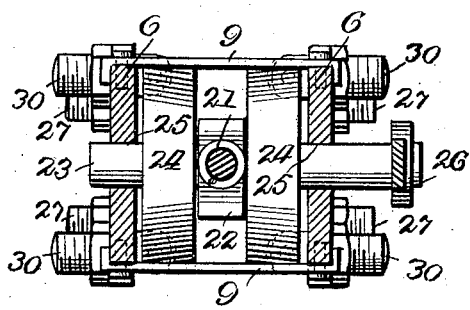
WITNESSES:
F. C. Barry
Geo. E. Tew
Harvey E. Spangler.
INVENTOR
BY Milo B. Stevens & Co.
Attorneys

UNITED STATES PATENT OFFICE.

HARVEY E. SPANGLER, OF CANTON, OHIO.

SPRING-PRESSING MACHINE.

No. 844,549.     Specification of Letters Patent.     Patented Feb. 19, 1907.

Application filed September 18, 1906. Serial No. 335,074.

*To all whom it may concern:*

Be it known that I, HARVEY E. SPANGLER, a citizen of the United States, residing at Canton, in the county of Stark and State of Ohio, have invented new and useful Improvements in Spring-Pressing Machines, of which the following is a specification.

This invention is a portable spring-fitting machine for making elliptical vehicle or car springs, and operates to press together the leaves of the spring while hot by means of rollers carried in a frame and rolled along the edges of the leaves of the spring, pressure being applied upon the rollers so that the leaves are rolled together evenly at all points along their length. The pressure can be adjustably varied as desired. The implement also has rolls to guide and straighten the spring-leaves at the sides thereof.

The device is illustrated in the accompanying drawings, in which—

Figure 1 is a side elevation. Fig. 2 is a side elevation at right angles to Fig. 1. Fig. 3 is a vertical section on the line 3 3 of Fig. 2. Fig. 4 is a cross-section on the line 4 4 of Fig. 2.

The frame of the machine consists of two side plates or branches 6, which are connected at the top by a cross-piece 7, integral with one of the side pieces and joined to the other side plate by screws 8. Lower down the branches are braced and connected by cross-pieces 9, secured to opposite side edges thereof. The cross-plate 7 is tapped to receive the tube 10, which depends therefrom between the sides 6. Slidably mounted in this tube is a hollow plunger 11, which has a head 12, which slides between a pair of extensions 13, projecting upwardly from the cross-plate 7. Mounted upon a pivot-bolt 14 between the ears or extensions 13, is a cam 15, formed with two branches bearing at opposite edges of the head 12, and this cam has an operating-lever 16. The cam has a series of holes 17, and the extensions 13 have several holes 18, and the throw of the cam may be varied by changing the pivot-pin 14 from one hole to the other. The head has a stop 19, against which the handle strikes when thrown over to prevent it from turning beyond center.

The lower end of the tubular plunger 11 bears upon the upper end of a heavy spring 20, coiled around a stem 21, the upper end of which fits within the plunger 11. The lower end of the stem is connected by a bearing-collar 22 to an axle 23, which carries a pair of pressure-wheels 24, arranged on opposite sides between the collar and the side plates 6. The ends of the axle are guided and held in place by vertical slots 25 in the side plates 6, and one end of said axle is provided with a crank 26, whereby it may be turned. The faces of the wheels are beveled or frusto-conical, with the small ends inwardly. Mounted upon headed studs 27 at the lower ends of the side plates 6 are two pairs of bottom rolls 28, and just above these rolls are two pairs of side rolls 29, carried in the forked inner ends of adjustable screw-studs 30.

In operation after the hot leaves are assembled the device described is run thereon. The requisite pressure is then applied by means of the cam. Then by turning the crank 26 the device is run up and down along the work, the wheels 24 bearing on top and the rolls 28 underneath, and the side rolls 29 run along the edges of the spring to set the leaves up straight. As stated, these side rolls may be adjusted in or out to suit wide or narrow springs. The frusto-conical faces of the wheels give the main pressure at the edges of the leaves, where it is needed.

The device has the advantage that the work may be clamped and held stationary while the fitting implement is used, and the fitting operation can be very quickly and easily performed.

I claim—

1. In a spring-making machine, the combination with a frame having opposite side plates and upper and lower pairs of rollers supported therein, between which the work is received, of adjustable screw-studs in the side plates, and rollers carried by said studs between said upper and lower rollers, and adapted to bear against the edges of the spring.

2. In a spring-making machine, in combination, a frame, pairs of upper and lower rollers therein, the upper rollers being mounted upon an axle slidable up and down in the frame, a plunger and means to force the same down toward the axle, and a spring between the plunger and the axle, to cushion the pressure.

3. In a spring-making machine, in combination, a frame, pairs of upper and lower rollers therein, the upper rollers being mounted upon an axle slidable up and down in the frame, a hollow plunger and means to force the same down toward the axle, a stem connected at one end to the axle and extending into the plunger at the other end, and a spring coiled around the stem between the plunger and axle.

4. In a spring-making machine, in combination, a frame, pairs of upper and lower rollers therein, the upper rollers being mounted upon an axle slidable up and down in the frame, a plunger movable up and down in the frame and having a spring connection to the axle, and a cam-lever mounted in the frame and bearing against the plunger, to advance the same.

In testimony whereof I have signed my name to this specification in the presence of two subscribing witnesses.

HARVEY E. SPANGLER.

Witnesses:
    LINA SPANGLER,
    M. A. ST. JOHN.